United States Patent
Ogaki et al.

(10) Patent No.: US 12,479,332 B2
(45) Date of Patent: Nov. 25, 2025

(54) BATTERY TEMPERATURE CONTROL SYSTEM

(71) Applicant: HONDA MOTOR CO., LTD., Tokyo (JP)

(72) Inventors: Toru Ogaki, Tokyo (JP); Syuhei Kouchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 373 days.

(21) Appl. No.: 18/099,017

(22) Filed: Jan. 19, 2023

(65) Prior Publication Data

US 2023/0234475 A1 Jul. 27, 2023

(30) Foreign Application Priority Data

Jan. 21, 2022 (JP) ................ 2022-007791

(51) Int. Cl.
*B60L 58/26* (2019.01)
*H01M 10/613* (2014.01)
(Continued)

(52) U.S. Cl.
CPC ........... *B60L 58/26* (2019.02); *H01M 10/613* (2015.04); *H01M 10/625* (2015.04);
(Continued)

(58) Field of Classification Search
CPC .......... B60L 58/24; B60L 58/26; B60L 58/27; B60L 2240/62; B60L 2240/622;
(Continued)

(56) References Cited

U.S. PATENT DOCUMENTS 9,020,671 B2 * 4/2015 Lindemann ............. B60L 50/16
701/22
11,072,963 B2 * 7/2021 Herman .................. B60L 58/24
(Continued)

FOREIGN PATENT DOCUMENTS

CN 110435563 A * 11/2019 ........... B60R 16/023
DE 102018131985 A1 * 6/2019 ......... H04L 12/2814
(Continued)

OTHER PUBLICATIONS

"Thermometrics Sensor Assemblies" Mar. 12, 2020, amphenol-sensors.com (Year: 2020).*

*Primary Examiner* — Erin M Piateski
*Assistant Examiner* — Ashley Tiffany Schoech
(74) *Attorney, Agent, or Firm* — Paratus Law Group, PLLC

(57) ABSTRACT

A battery temperature control system, maintaining a temperature of a battery mounted on an electric vehicle within a target temperature range while the electric vehicle is stopped, includes: an environment estimation unit configured to estimate an environment in which the electric vehicle is stopped; a reference temperature setting unit configured to set a reference temperature from a plurality of pieces of temperature information based on the environment estimated by the environment estimation unit; a battery temperature transition prediction unit configured to predict a temperature transition of the battery based on the reference temperature; and a battery temperature adjustment unit configured to adjust the temperature of the battery based on the temperature transition of the battery.

6 Claims, 8 Drawing Sheets

(51) Int. Cl.
*H01M 10/625* (2014.01)
*H01M 10/633* (2014.01)

(52) U.S. Cl.
CPC ..... *H01M 10/633* (2015.04); *B60L 2240/622* (2013.01); *H01M 2220/20* (2013.01)

(58) Field of Classification Search
CPC ......... B60L 2240/545; B60L 2240/662; B60L 2240/665; B60L 2240/66; B60L 2260/56; H01M 10/60; H01M 10/61; H01M 10/613; H01M 10/615; H01M 10/625; H01M 10/635; H01M 10/633; H01M 2220/20; H01M 10/486

See application file for complete search history.

(56) References Cited

U.S. PATENT DOCUMENTS

| | | | |
|---|---|---|---|
| 2016/0107656 A1* | 4/2016 | Lovett | B60H 1/00778 701/22 |
| 2020/0243924 A1 | 7/2020 | Kinoshita | |
| 2021/0210810 A1* | 7/2021 | Chuang | B60L 1/02 |
| 2021/0370799 A1* | 12/2021 | Li | B60L 58/26 |
| 2023/0055958 A1* | 2/2023 | Maraldo | G06Q 30/06 |

FOREIGN PATENT DOCUMENTS

| | | |
|---|---|---|
| DE | 102019202731 A1 * | 9/2020 |
| JP | 2006-139963 A | 6/2006 |
| JP | 2008193181 A * | 8/2008 |
| JP | 2019-126170 A | 7/2019 |
| JP | 2019-161791 A | 9/2019 |
| JP | 2020-089021 A | 6/2020 |
| JP | 2020083170 A * | 6/2020 |
| JP | 2020-124012 A | 8/2020 |

* cited by examiner

FIG. 1
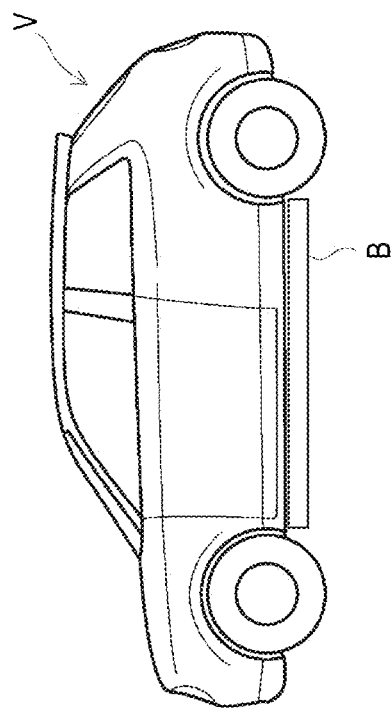
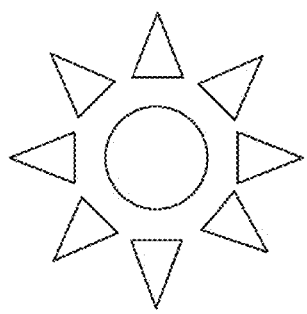
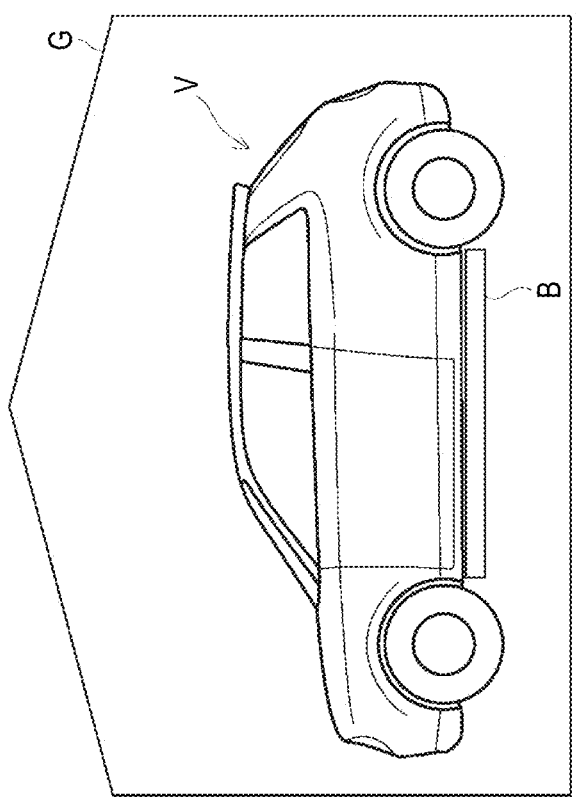

BATTERY TEMPERATURE CONTROL SYSTEM

CROSS-REFERENCE TO RELATED APPLICATIONS

The present application claims the benefit of priority of Japanese Patent Application No. 2022-007791, filed on Jan. 21, 2022, the content of which is incorporated herein by reference.

TECHNICAL FIELD

The present disclosure relates to a battery temperature control system.

BACKGROUND ART

In recent years, as a specific measure against climatic variation of the earth, efforts to realize a low-carbon society or a decarbonized society have been actively made. Also in moving bodies such as vehicles, a reduction in $CO_2$ emission amount is strongly required, and a drive source is rapidly electrified. Specifically, a vehicle including an electric motor as a drive source of the vehicle and a battery as a secondary battery capable of supplying electric power to the electric motor, such as an electrical vehicle or a hybrid electrical vehicle, has been developed.

When the battery is left in a high temperature state, there is a possibility that the battery is deteriorated or the performance thereof is degraded. Therefore, a technique for cooling a battery is known (for example, JP-A-2020-124012, JP-A-2020-89021, JP-A-2019-161791, JP-A-2019-126170 and JP-A-2006-139963).

In addition, when the battery is exposed to a high temperature state equal to or higher than a predetermined temperature or a low temperature state equal to or lower than a predetermined temperature while the vehicle is stopped, there is a possibility that the electric vehicle cannot be appropriately driven when a user tries to use the electric vehicle.

In order to prevent a battery from being in a high temperature state equal to or higher than a predetermined temperature or a low temperature state equal to or lower than a predetermined temperature while a vehicle is stopped, it is necessary to predict a temperature transition of the battery and adjust a temperature of the battery, but there is room for study on how to predict the temperature transition of the battery.

SUMMARY

The present disclosure provides a battery temperature control system capable of appropriately predicting a temperature transition of a battery.

According to an aspect of the present disclosure, there is provided a battery temperature control system that maintains a temperature of a battery mounted on an electric vehicle within a target temperature range while the electric vehicle is stopped, the battery temperature control system including: an environment estimation unit configured to estimate an environment in which the electric vehicle is stopped; a reference temperature setting unit configured to set a reference temperature from a plurality of pieces of temperature information based on the environment estimated by the environment estimation unit; a battery temperature transition prediction unit configured to predict a temperature transition of the battery based on the reference temperature; and a battery temperature adjustment unit configured to adjust the temperature of the battery based on the temperature transition of the battery.

According to the present disclosure, a temperature transition of a battery can be appropriately predicted.

BRIEF DESCRIPTION OF THE DRAWINGS

FIG. 1 is a diagram showing an electric vehicle V stopped inside and outside a building.

DESCRIPTION OF EMBODIMENTS

Hereinafter, an embodiment of the present disclosure will be described with reference to FIGS. 1 to 7.

Figure 2:
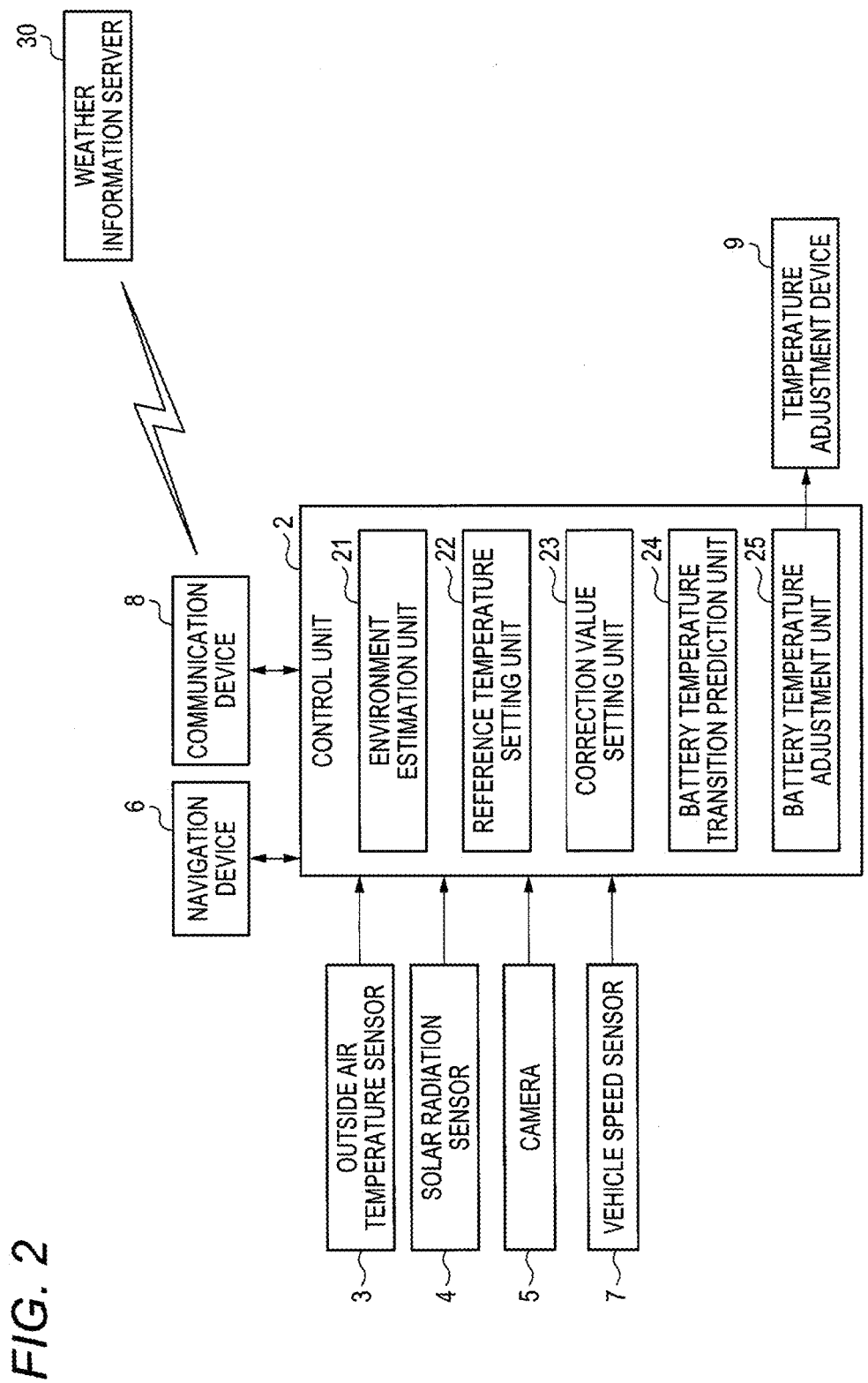
FIG. 2 is a block diagram showing a configuration of a battery temperature control system 1.

As shown in FIGS. 1 and 2, an electric vehicle V includes an electric motor (not shown) as a drive source, a battery B as a secondary battery capable of supplying electric power to the electric motor, and a battery temperature control system 1 that maintains a temperature of the battery B within a target temperature range while the electric vehicle V is stopped.

The battery temperature control system 1 predicts a temperature transition of the battery B during stopping of the electric vehicle V, and adjusts the temperature of the battery B based on the predicted temperature transition. At that time, the battery temperature control system 1 switches a method of predicting the temperature transition of the battery B according to an environment in which the electric vehicle V is stopped. For example, when the environment in which the electric vehicle V is stopped is inside a building G (for example, inside a home garage, inside a covered parking lot, etc.) as shown on a left side of FIG. 1 and when the environment in which the electric vehicle V is stopped is outside the building G (for example, outdoor parking at home, parking at an uncovered parking lot, on-street parking, etc.) as shown on a right side of FIG. 1, the temperature transition of the battery B is predicted by using different prediction methods. Hereinafter, a specific configuration of the battery temperature control system 1 will be described.

As shown in FIG. 2, the battery temperature control system 1 includes a control unit 2 that executes battery temperature control, which will be described later. An outside air temperature sensor 3 that detects an outside air temperature, a solar radiation sensor 4 that detects a solar radiation amount, a camera 5 that captures an image of an outside of the vehicle, a navigation device 6, a vehicle speed sensor 7 that detects a vehicle speed, a communication device 8 capable of communicating with a weather information server 30, and a temperature adjustment device 9 that adjusts the temperature of the battery B are connected to the control unit 2. Therefore, the control unit 2 receives the outside air temperature from the outside air temperature sensor 3, the solar radiation amount from the solar radiation sensor 4, image data of the outside of the vehicle from the camera 5, and information related to the vehicle speed from the vehicle speed sensor 7.

The navigation device 6 includes, for example, a global navigation satellite system (GNSS) receiver and a navigation HMI, and stores map information in a storage device such as a hard disk drive (HDD) or a flash memory. The GNSS receiver specifies a position of a host vehicle based on a signal received from a GNSS satellite. The navigation HMI includes a display device, a speaker, a touch panel, a key, and the like. The map information is, for example, information in which a road shape is expressed by a link indicating a road and nodes connected by the link. It should be noted that the navigation device may be implemented by, for example, a function of a terminal device such as a smart phone or a tablet terminal owned by a user.

The communication device 8 includes a wireless module for connecting a cellular network or a Wi-Fi network. The communication device 8 communicates with the weather information server 30 and the like via a network NW such as the Internet or the Ethernet, for example.

The temperature adjustment device 9 cools the battery B by causing a refrigerant to flow through a refrigerant flow channel provided in the battery B. The temperature adjustment device 9 is, for example, a water-cooled type, circulates the refrigerant by a pump, and cools the refrigerant by a radiator. It should be noted that a heater is provided in the temperature adjustment device 9, and the battery B can also be heated.

As functional configurations implemented by cooperation between hardware and software, the control unit 2 includes an environment estimation unit 21, a reference temperature setting unit 22, a correction value setting unit 23, a battery temperature transition prediction unit 24, and a battery temperature adjustment unit 25.

Figure 3:
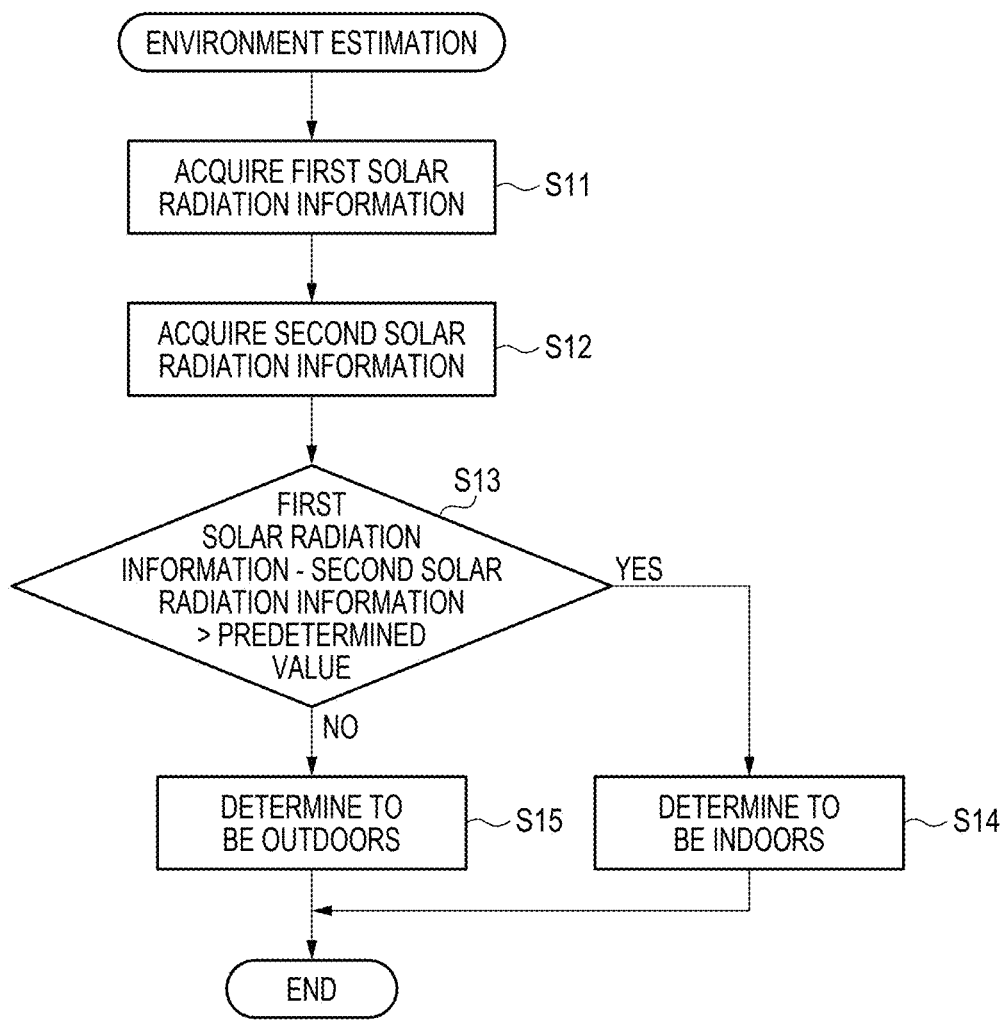
FIG. 3 is a flowchart showing an environment estimation procedure.
Figure 4:
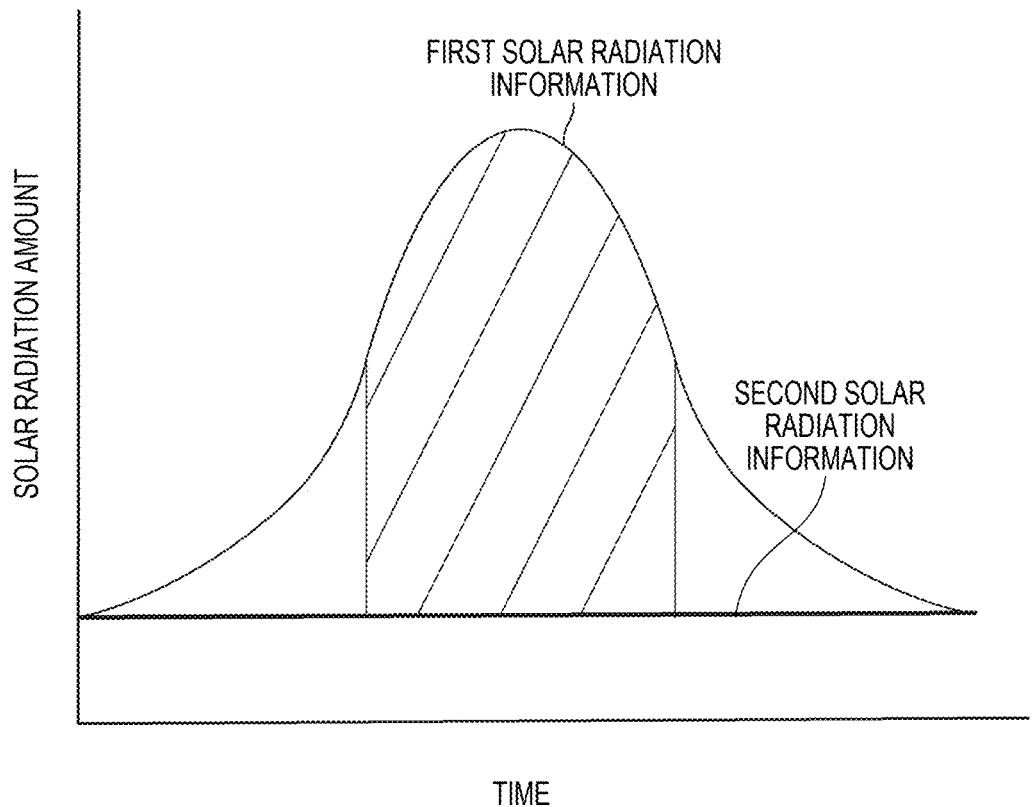
FIG. 4 is a diagram showing a relationship between first solar radiation information based on solar radiation information and second solar radiation information based on a solar radiation sensor.
Figure 5:
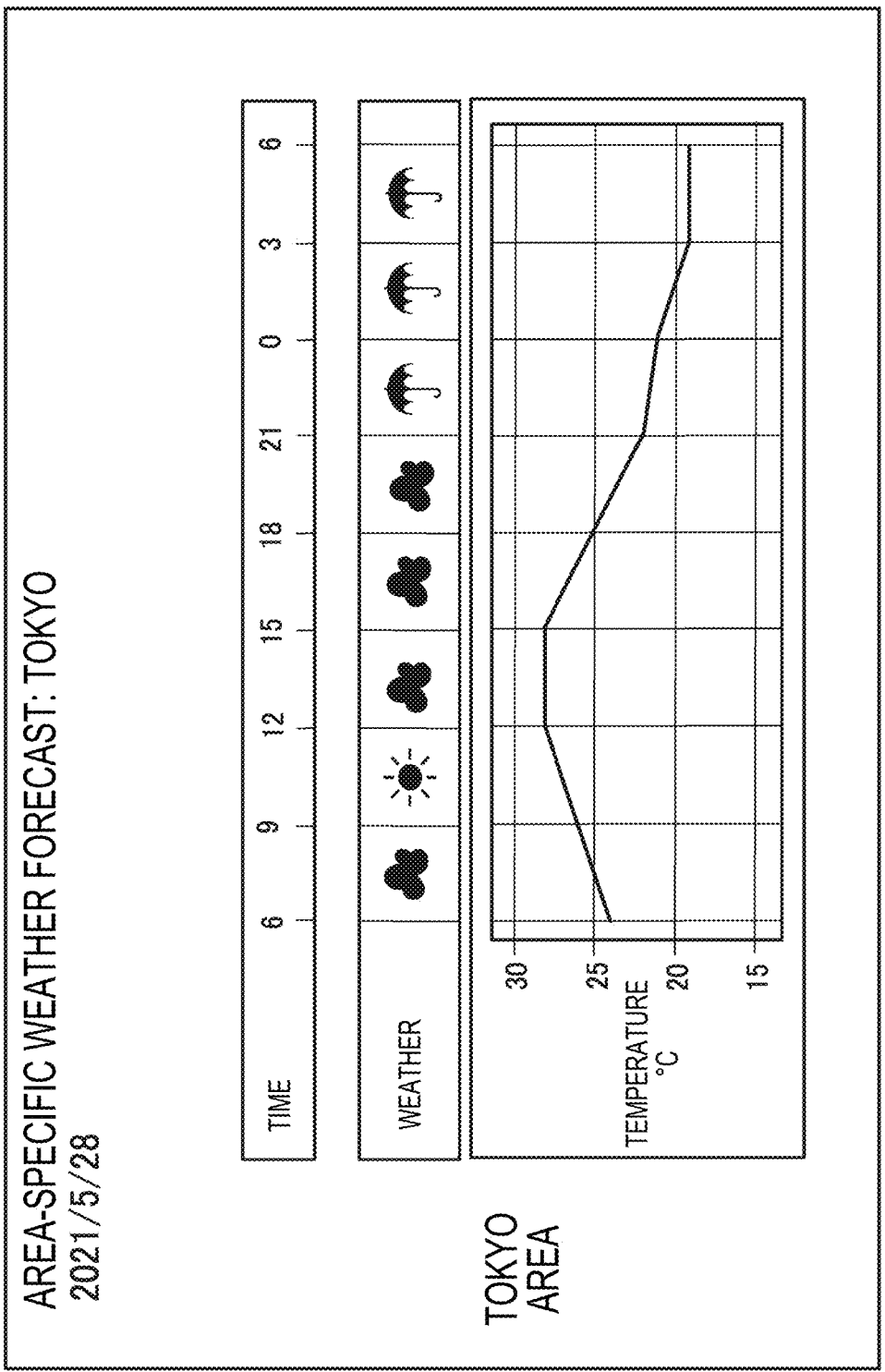
FIG. 5 is a diagram showing an example of weather forecast information.

The environment estimation unit 21 estimates the environment in which the electric vehicle V is stopped. For example, the environment estimation unit 21 estimates whether the environment in which the electric vehicle V is stopped is outside the building G or inside the building G based on the image of the outside of the vehicle captured by the camera 5. In addition, as shown in FIGS. 3 and 4, the environment estimation unit 21 may estimate, based on a difference between first solar radiation information based on a weather forecast and second solar radiation information based on the solar radiation sensor 4, whether the environment in which the electric vehicle V is stopped is outside the building G or inside the building G. Specifically, as shown in FIG. 3, solar radiation information included in the weather forecast or solar radiation information estimated based on the weather forecast is acquired as the first solar radiation information (S11), the second solar radiation information based on the solar radiation sensor 4 is acquired (S12), then it is determined whether the difference between the first solar radiation information and the second solar radiation information is larger than a predetermined value (S13), when the determination result is YES (for example, a shaded region in FIG. 4), it is determined that the environment in which the electric vehicle V is stopped is inside the building G (S14), and when the determination result is NO, it is determined that the environment in which the electric vehicle V is stopped is outside the building G (S15).

The reference temperature setting unit 22 sets a reference temperature from a plurality of pieces of temperature information based on the environment estimated by the environment estimation unit 21. The plurality of pieces of temperature information includes first temperature information based on a weather forecast (see FIG. 5) and second temperature information based on the outside air temperature sensor 3. When the environment in which the electric vehicle V is stopped is outside the building G, the reference temperature setting unit 22 sets the first temperature information as the reference temperature, and when the environment in which the electric vehicle V is stopped is inside the building G, the reference temperature setting unit 22 sets the second temperature information as the reference temperature.

When the outside air temperature sensor 3 mounted on the electric vehicle V is exposed to solar radiation, the outside air temperature sensor 3 tends to be affected by heat and a temperature thereof rises to a high level. Therefore, when the environment in which the electric vehicle V is stopped is outside the building G, it is possible to predict the temperature transition of the battery B with high accuracy by setting the first temperature information based on a weather forecast as the reference temperature used to predict the temperature transition of the battery B by the reference temperature setting unit 22 of the present embodiment. On the other hand, when the environment in which the electric vehicle V is stopped is inside the building G, a temperature inside the building G deviates from the first temperature information, and thus, it is possible to predict the temperature transition of the battery B with high accuracy by setting the second temperature information based on the outside air temperature sensor 3 mounted on the electric vehicle V as the reference temperature.

Figure 6:
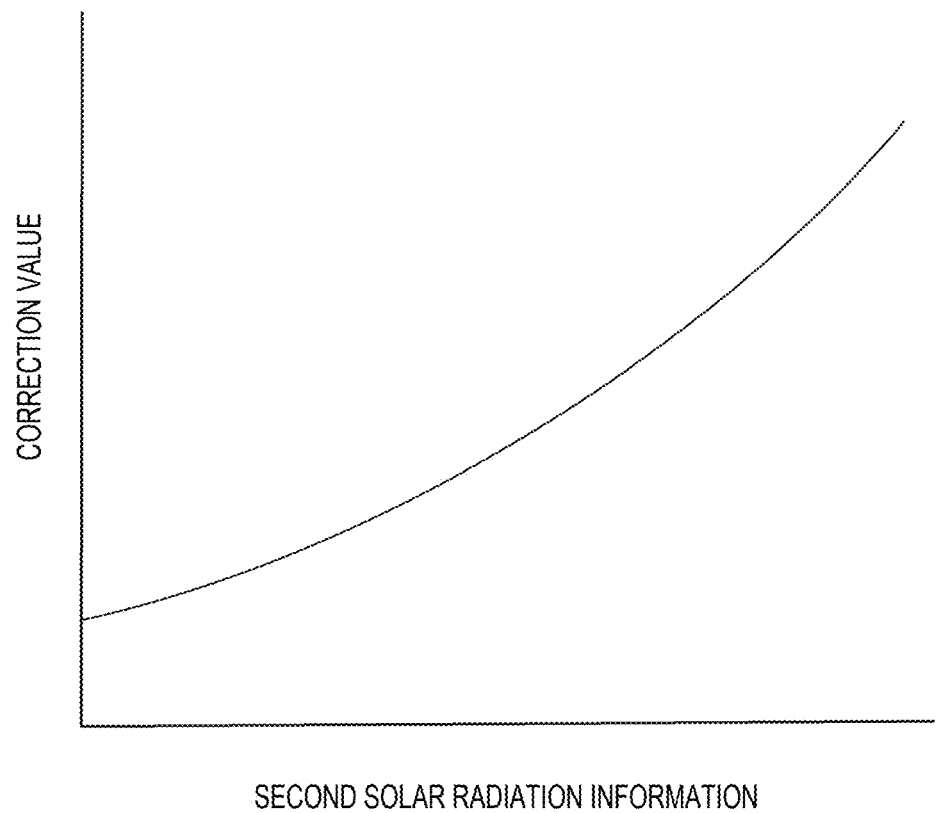
FIG. 6 is a diagram showing a relationship between a solar radiation amount and a correction amount.

The correction value setting unit 23 sets a correction value according to the environment in which the electric vehicle V is stopped. For example, when the environment in which the electric vehicle V is stopped is outside the building G, the temperature of the battery B changes depending on whether the electric vehicle V is in a sunny place or a shade, in other words, depending on a solar radiation condition, and thus, as shown in FIG. 6, the correction value is set based on the second solar radiation information based on the solar radiation sensor 4.

The battery temperature transition prediction unit 24 predicts the temperature transition of the battery B based on the reference temperature set by the reference temperature setting unit 22 and the correction value set by the correction value setting unit 23. For example, when the environment in which the electric vehicle V is stopped is outside the building G, the temperature transition of the battery B is predicted based on the first temperature information which is the reference temperature, and the correction value set according to the solar radiation condition, and when the environment in which the electric vehicle V is stopped is inside the building G, the temperature transition of the battery B is predicted based on the second temperature information which is the reference temperature.

The battery temperature adjustment unit 25 adjusts the temperature of the battery B based on the temperature transition of the battery B predicted by the battery temperature transition prediction unit 24. For example, when the temperature of the battery B predicted by the battery temperature adjustment unit 25 is higher than the target temperature range, the temperature adjustment device 9 is controlled to cool the battery B, and when the temperature of the battery B predicted by the battery temperature adjustment unit 25 is lower than the target temperature range, the temperature adjustment device 9 is controlled to heat the battery B. Accordingly, it is possible to prevent an output of the battery B from being limited or prevent the output of the battery B from being insufficient due to the temperature of the battery B being too high or too low when an occupant starts the electric vehicle V after stopping the electric vehicle V, and convenience of the electric vehicle V is improved.

Next, battery temperature control procedures executed by the control unit 2 that implement the functional configurations as described above will be described with reference to FIG. 7.

Figure 7:
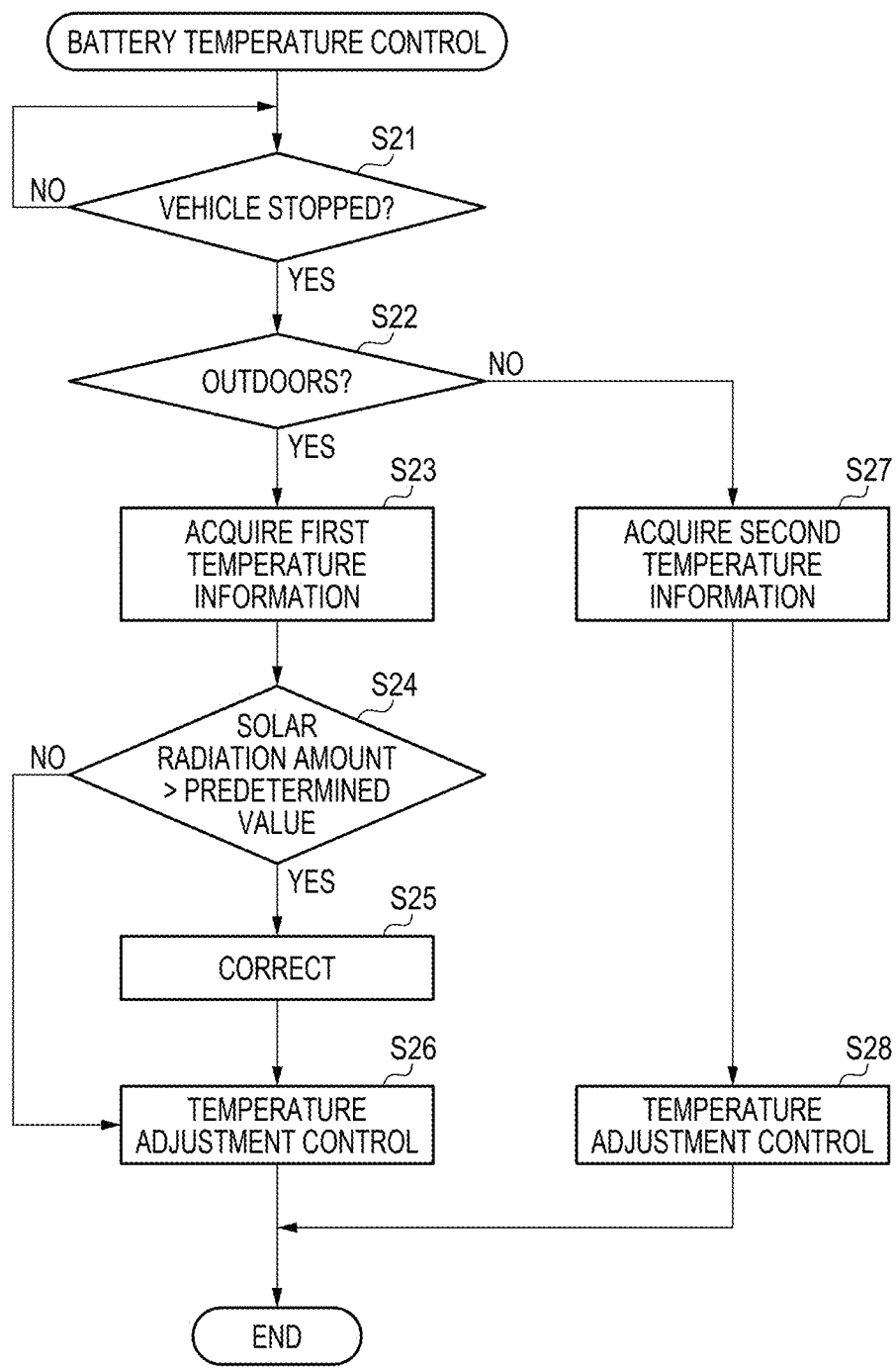
FIG. 7 is a flowchart showing an example of battery temperature control procedures.

As shown in FIG. 7, in the battery temperature control, the control unit 2 firstly determines whether the electric vehicle V is stopped based on an output of the vehicle speed sensor 7 (S21), when the determination result is NO, the control unit 2 repeats the process until it is determined that the electric vehicle V is stopped, and when the determination result is YES, the control unit 2 proceeds to step S22.

When the control unit 2 proceeds to step S22, the control unit 2 estimates the environment in which the electric vehicle V is stopped, and determines whether the environment is outdoors. The control unit 2 proceeds to step S23 when the determination result is YES, and proceeds to step S27 when the determination result is NO.

When the control unit 2 proceeds to step S23, the control unit 2 acquires the first temperature information based on the weather forecast as the reference temperature, and then determines whether the solar radiation amount based on the solar radiation sensor 4 (second solar radiation information) exceeds a predetermined value (S24). When the determination result is YES, the control unit 2 sets a correction value based on the solar radiation amount (second solar radiation information) (S25), and then controls the temperature adjustment device 9 based on the first temperature information and the correction value (S26). In addition, when the determination result in step S24 is NO, the control unit 2 skips step S25 and controls the temperature adjustment device 9 based on the first temperature information (S26).

On the other hand, when the control unit 2 proceeds to step S27, the control unit 2 acquires the second temperature information based on the outside air temperature sensor 3 as the reference temperature, and then controls the temperature adjustment device 9 based on the second temperature information (S28).

Next, another example of the battery temperature control procedures will be described with reference to FIG. 8. However, control procedures common to the battery temperature control procedures shown in FIG. 7 are denoted by the same reference numerals as those in the battery temperature control procedures shown in FIG. 7, and thus, the description of the battery temperature control procedures shown in FIG. 7 is omitted.

Figure 8:
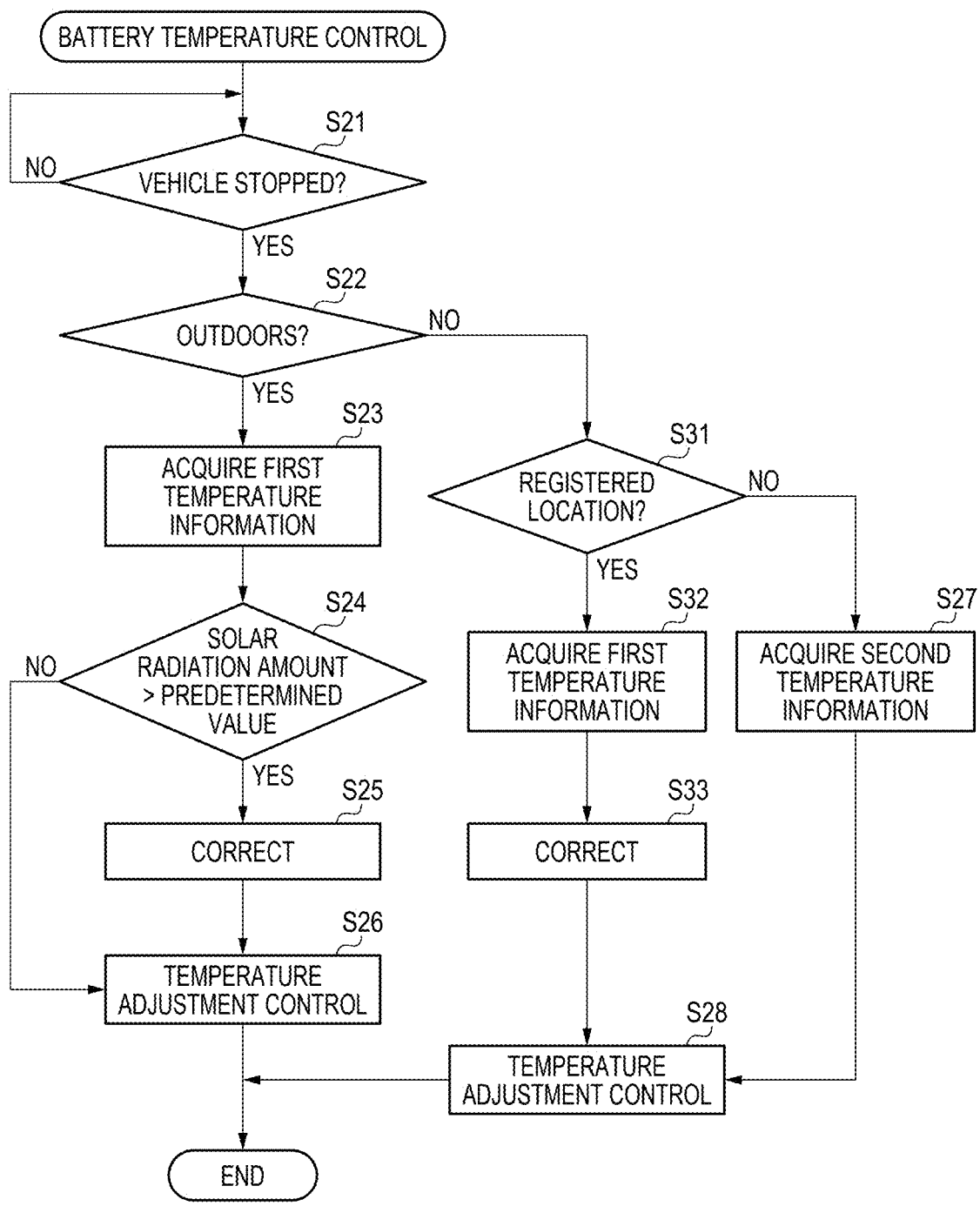
FIG. 8 is a flowchart showing another example of the battery temperature control procedures.

As shown in FIG. 8, in another example of the battery temperature control, when the determination result is NO in step S22, the control unit 2 determines whether a stop position of the electric vehicle V is a previously registered location (for example, inside the home garage) (S31). When the determination result is NO, similarly to the battery temperature control procedures shown in FIG. 7, the control unit 2 acquires the second temperature information based on the outside air temperature sensor 3 as the reference temperature (S27), and then controls the temperature adjustment device 9 based on the second temperature information (S28). On the other hand, when the determination result in step S31 is YES, the control unit 2 acquires the first temperature information based on the weather forecast (S32) and sets a correction value based on information regarding the registered location (S33), and then controls the temperature adjustment device 9 based on the first temperature information and the correction value (S28).

According to the another example of the battery temperature control procedures, by setting the correction value based on a positional state of a location where the electric vehicle V is often stopped, it is possible to make a correction considering a heat insulation capacity of the registered location, and even when the environment in which the electric vehicle V is stopped is the inside the building G, the temperature transition of the battery B can be predicted with high accuracy based on the first temperature information based on the weather forecast. It should be noted that the heat insulation capacity of the registered location may be obtained by calculating the heat insulation capacity (time constant) of the registered location in advance based on the second temperature information based on the outside air temperature sensor 3 and the first temperature information based on the weather forecast, and may be stored in a memory or the like in association with the registered location.

Although various embodiments have been described above with reference to the accompanying drawings, it is needless to say that the present disclosure is not limited to such examples. It is apparent to those skilled in the art that various changes and modifications can be conceived within the scope of the claims, and it is also understood that such changes and modifications naturally belong to the technical scope of the present disclosure. In addition, constituent elements in the above embodiments may be freely combined without departing from the spirit of the disclosure.

At least the following matters are described in the present specification. It should be noted that in the parentheses, the corresponding constituent elements and the like in the above embodiments are shown, and the present disclosure is not limited thereto.

(1) A battery temperature control system (battery temperature control system 1) that maintains a temperature of a battery (battery B) mounted on an electric vehicle (electric vehicle V) within a target temperature range while the electric vehicle is stopped, the battery temperature control system comprising:

an environment estimation unit (environment estimation unit 21) configured to estimate an environment in which the electric vehicle is stopped;

a reference temperature setting unit (reference temperature setting unit 22) configured to set a reference temperature from a plurality of pieces of temperature information based on the environment estimated by the environment estimation unit;

a battery temperature transition prediction unit (battery temperature transition prediction unit 24) configured to predict a temperature transition of the battery based on the reference temperature; and a battery temperature adjustment unit (battery temperature adjustment unit 25) configured to adjust the temperature of the battery based on the temperature transition of the battery.

According to (1), since the reference temperature is set from the plurality of pieces of temperature information, and the temperature transition of the battery is predicted based on the reference temperature, it is possible to predict the temperature transition of the battery with high accuracy regardless of the environment in which the electric vehicle is stopped.

(2) The battery temperature control system according to (1), in which the plurality of pieces of temperature information includes first temperature information based on a weather forecast and second temperature information based on an outside air temperature sensor (outside air temperature sensor 3) mounted on the electric vehicle, when the environment in which the electric vehicle is stopped is outside a building, the reference temperature is the first temperature information, when the environment in which the electric vehicle is stopped is inside a building, the reference temperature is the second temperature information.

When the outside air temperature sensor mounted on the electric vehicle is exposed to solar radiation, the outside air temperature sensor is affected by heat and the temperature thereof rises to a high level. Therefore, according to (2), when the environment in which the electric vehicle is stopped is outside the building, it is possible to predict the temperature transition of the battery with high accuracy by predicting the temperature transition of the battery based on the first temperature information based on the weather forecast. On the other hand, when the environment in which the electric vehicle is stopped is inside the building, the temperature inside the building deviates from the first temperature information based on the weather forecast, and thus, it is possible to predict the temperature transition of the battery with high accuracy by predicting the temperature transition of the battery based on the second temperature information based on the outside air temperature sensor mounted on the electric vehicle.

(3) The battery temperature control system according to (2), in which the environment estimation unit estimates, based on an image acquisition device (camera 5) mounted on the electric vehicle, whether the environment in which the electric vehicle is stopped is outside the building or inside the building.

According to (3), it is possible to easily estimate whether the environment in which the electric vehicle is stopped is outside the building or inside the building by the image acquisition device mounted on the electric vehicle.

(4) The battery temperature control system according to (2), in which the environment estimation unit estimates, based on a difference between first solar radiation information based on a weather forecast and second solar radiation information based on a solar radiation sensor (solar radiation sensor 4) mounted on the electric vehicle, whether the environment in which the electric vehicle is stopped is outside the building or inside the building.

According to (4), it is possible to easily estimate, based on the difference between the first solar radiation information based on the weather forecast and the second solar radiation information based on the solar radiation sensor mounted on the electric vehicle, whether the environment in which the electric, vehicle is stopped is outside the building or inside the building.

(5) The battery temperature control system according to any one of (1) to (4), further comprising:

a correction value setting unit (correction value setting unit 23) configured to set a correction value according to the environment in which the electric vehicle is stopped, in which the battery temperature transition prediction unit predicts the temperature transition of the battery based on the reference temperature and the correction value.

According to (5), it is possible to predict the temperature transition of the battery with high accuracy by predicting the temperature transition of the battery based on the reference temperature and the correction value.

(6) The battery temperature control system according to (5), in which when the environment in which the electric vehicle is stopped is outside a building, the correction value setting unit sets the correction value based on second solar radiation information based on a solar radiation sensor (solar radiation sensor 4) mounted on the electric vehicle.

According, to (6), when the environment in which the electric vehicle is stopped is outside the building, it is possible to predict the temperature transition of the battery with higher accuracy by setting the correction value according to the solar radiation amount.

(7) The battery temperature control system according to (1), in which the plurality of pieces of temperature information includes first temperature information based on a weather forecast and second temperature information based on an outside air temperature sensor mounted on the electric vehicle, when the environment in which the electric vehicle is stopped is outside a building, the reference temperature is the first temperature information, when the environment in which the electric vehicle is stopped is inside a building and a position of the electric vehicle is a previously registered location, the reference temperature is the first temperature information, when the environment in which the electric vehicle is stopped is inside a building and a position of the electric vehicle is not a previously registered location, the reference temperature is the second temperature information.

According to (7), when the position of the electric vehicle is the previously registered location, it is possible to predict the temperature transition of the battery with high accuracy based on the first temperature information based on the weather forecast even when the environment in which the electric vehicle is stopped is inside the building.

(8) The battery temperature control system according to (7), further comprising:

a correction value setting unit (correction value setting unit 23) configured to set a correction value according to the environment in which the electric vehicle is stopped, in which when the environment in which the electric vehicle is stopped is inside a building and a position of the electric vehicle is a previously registered location, the correction value setting unit sets the correction value based on a heat insulation capacity of the registered location.

According to (8), by setting the correction value based on a positional state of the location where the electric vehicle V is often stopped, it is possible to predict the temperature transition of the battery with higher accuracy based on a heat insulation performance and the like of the location.

The invention claimed is:

1. A battery temperature control system that maintains a temperature of a battery mounted on an electric vehicle within a target temperature range while the electric vehicle is stopped, the battery temperature control system comprising:

a processor configured to:
  estimate an environment in which the electric vehicle is stopped;
  set a reference temperature from a plurality of pieces of temperature information based on the environment estimated by the processor;
  predict a temperature transition of the battery based on the reference temperature; and
  adjust the temperature of the battery based on the temperature transition of the battery, wherein:
the plurality of pieces of temperature information comprises first temperature information, based on a weather forecast, and second temperature information, based on an outside air temperature sensor mounted on the electric vehicle;
when the environment in which the electric vehicle is stopped is outside a building, the reference temperature is the first temperature information;
when the environment in which the electric vehicle is stopped is inside a building and a position of the electric vehicle is a previously registered location, the reference temperature is the first temperature information; and
when the environment in which the electric vehicle is stopped is inside a building and a position of the electric vehicle is not a previously registered location, the reference temperature is the second temperature information.

2. The battery temperature control system according to claim 1, wherein
  the processor is further configured to estimate whether the environment in which the electric vehicle is stopped is outside the building or inside the building based on an image acquisition device mounted on the electric vehicle.

3. The battery temperature control system according to claim 1, wherein
  the processor is further configured to estimate whether the environment in which the electric vehicle is stopped is outside the building or inside the building based on a difference between first solar radiation information, based on a weather forecast, and second solar radiation information, based on a solar radiation sensor mounted on the electric vehicle.

4. The battery temperature control system according to claim 1, wherein the processor is further configured to:
  set a correction value according to the environment in which the electric vehicle is stopped; and
  predict the temperature transition of the battery based on the reference temperature and the correction value.

5. The battery temperature control system according to claim 4, wherein
  when the environment in which the electric vehicle is stopped is outside a building, the processor sets the correction value based on second solar radiation information based on a solar radiation sensor mounted on the electric vehicle.

6. The battery temperature control system according to claim 1, wherein the processor is further configured to:
  set a correction value according to the environment in which the electric vehicle is stopped, and wherein
  when the environment in which the electric vehicle is stopped is inside a building and a position of the electric vehicle is a previously registered location, the processor sets the correction value based on a heat insulation capacity of the registered location.

* * * * *